US 6,632,496 B1

(12) United States Patent
Johnson et al.

(10) Patent No.: US 6,632,496 B1
(45) Date of Patent: Oct. 14, 2003

(54) THERMAL INSULATION SYSTEM FOR PROTECTING FLUID LINES AND METHOD FOR MAKING SAME

(75) Inventors: Michael R. C. Johnson, Hayward, CA (US); Christopher C. Foeger, Portola Valley, CA (US)

(73) Assignee: Sumitomo Electric Interconnect Products, Inc., Santa Clara, CA (US)

( * ) Notice: Subject to any disclaimer, the term of this patent is extended or adjusted under 35 U.S.C. 154(b) by 0 days.

(21) Appl. No.: 09/456,024

(22) Filed: Dec. 3, 1999

(51) Int. Cl.$^7$ ............... B65B 53/00; B29D 22/00; B32B 1/08; B32B 15/04; B32B 7/12; D02G 3/00; F15B 15/22

(52) U.S. Cl. ............ 428/36.9; 428/34.9; 428/36.91; 428/346; 428/361; 92/8

(58) Field of Search ............... 428/36.9, 34.9, 428/36.91, 346, 361; 92/8

(56) References Cited

U.S. PATENT DOCUMENTS

| 3,576,387 A | * | 4/1971 | Derby ............... 174/36 |
| 3,873,409 A | * | 3/1975 | Jehier ............... 161/214 |
| 3,898,369 A | * | 8/1975 | Clabburn ............... 174/36 |
| 4,246,057 A | | 1/1981 | Janowski et al. |
| 4,307,756 A | | 12/1981 | Voigt et al. |
| 4,396,142 A | | 8/1983 | Lines, Jr. et al. |
| 4,509,559 A | | 4/1985 | Cheetham et al. |
| 4,531,991 A | | 7/1985 | Ziemek et al. |
| 4,794,026 A | | 12/1988 | Boultinghouse |
| 4,874,648 A | | 10/1989 | Hill et al. |
| 5,100,725 A | | 3/1992 | Pearson |
| 5,287,894 A | * | 2/1994 | Shukushima et al. ....... 138/140 |
| 5,405,665 A | | 4/1995 | Shukushima et al. |
| 5,660,899 A | | 8/1997 | Rockney et al. |
| 5,718,956 A | | 2/1998 | Gladfelter et al. |

* cited by examiner

Primary Examiner—Harold Pyon
Assistant Examiner—Patricia L. Nordmeyer
(74) Attorney, Agent, or Firm—Stout, Uxa, Buyan & Mullins, LLP; Donald E. Stout

(57) ABSTRACT

A thermal insulation system includes two separate components for providing protection against both thermal and radiative conduction of energy, is easily installed, capable of easily fitting multiple substrate diameters, space-saving and lightweight, and durable. The system comprises an inner layer of heat shrink foam and an outer layer of reflective material. In the preferred embodiment, the outer layer of reflective material is heat shrink metalized material which has been recovered using known techniques onto the inner layer of heat shrink insulative material. One application for this system is for the insulation of vehicle brake fluid lines.

18 Claims, 1 Drawing Sheet

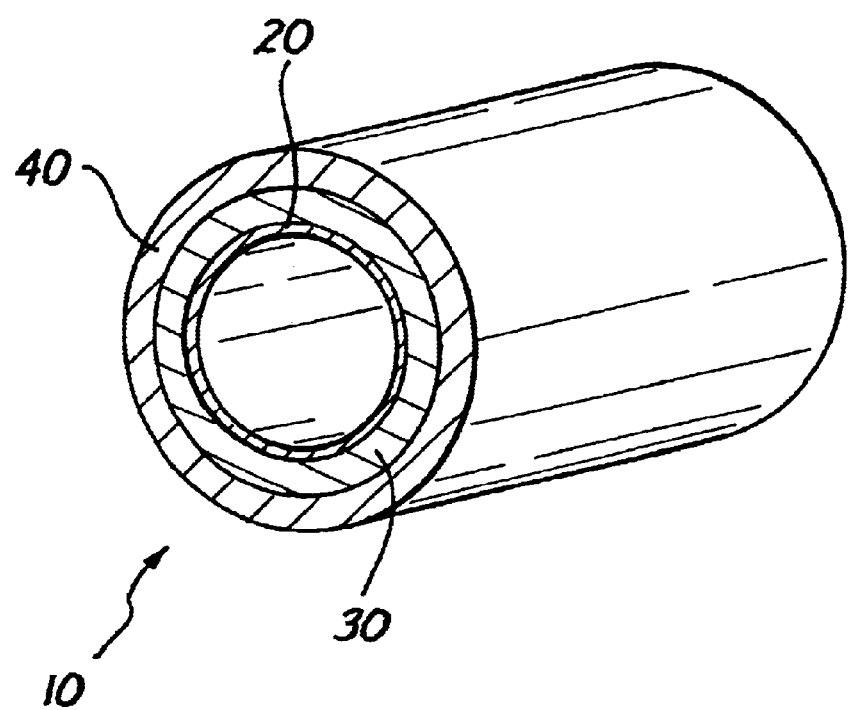

THERMAL INSULATION SYSTEM FOR PROTECTING FLUID LINES AND METHOD FOR MAKING SAME

BACKGROUND OF THE INVENTION

This invention relates to thermal insulation, and particularly to a thermal insulation system for protecting an elongate substrate such as a metal pipe or other fluid conduit.

Oftentimes, a requirement arises for a flexible material which can be used to resist both thermal and radiative conduction of energy. For example, such material can be formed into flexible tubing of the kind commonly used to protect components such as electrical wiring, brake and fuel lines from heat, particularly the heat sources found in automotive engine compartments. An important requirement for such tubing is flexibility, which for present purposes includes the properties of bendability, the ability to stretch circumferentially, shape retention, and ease of installation, together with the ability to resist heat transfer to the substrate to be protected. Such flexible materials may, in addition to their ability to keep items cool, alternatively be used to keep items warm by resisting heat transfer away therefrom.

A currently used product for providing such protection and insulation is a tube or sleeve comprising a foamed substrate, which is comprised of a material such as PVC/nitrile or urethane. Such a product can be quite effective in insulating against thermally conducted heat, but typically provides little protection from radiant heat. In use, where a radiant heat source is in close proximity, the foam tube has a tendency to degrade and disintegrate, falling away and thus exposing the hose or other protected component. Some attempts to reinforce the tubing to prevent such disintegration have involved, for example, the use of a polymeric transfer film. This approach has been found to offer little protection from radiant heat. Other attempts to prevent foam disintegration have involved the use of materials such as glass fabrics and graphite paper, which have been found to render the sleeve stiff and inflexible.

Prior art attempts to remedy these problems with foamed insulation have typically involved the use of an aluminized wrap of some kind, over a fiberglass insulation layer, the wrap being secured using VELCRO® hook and loop fastener or tape closures. The purpose of the metalized or aluminized wrap is to impart reflective properties to the sleeving, in order to more effectively protect against heat radiated at infra-red wavelengths. More recently, as disclosed in U.S. Pat. No. 5,718,956 to Gladfelter et al., which is assigned to Bentley-Harris, Inc., of Exton, Pennsylvania, a sleeving product for brake fluid lines, and the like, has been developed which comprises an inner tubular layer of flexible foamed insulating material, and an exterior cover layer comprising a flexible polymeric film to the surface of which a nonporous, thin coating of heat reflective metal has been applied, by vacuum deposition methods or the like, wherein the metal is for the purpose of resisting radiative heat conduction.

The problem with the prior art insulation systems, even those which include reflective components for resisting radiative heat conduction, are that they are difficult to manufacture, and to adapt to variously sized and configured systems. They also can be bulky and add substantial weight to the underlying components which require the afforded thermal protection. Additionally, over time, and because these systems are inherently disposed in hostile environments, the insulation has a tendency to fall off of the substrate, resulting in rapid system failures, and overall device breakdowns as a result of the overheating of the no longer thermally protected component.

SUMMARY OF THE INVENTION

The present invention solves the problems outlined above by providing a thermal insulation system which includes two separate components for providing protection against both thermal and radiative conduction of energy, is easily installed, capable of easily fitting multiple substrate diameters, space-saving and lightweight, and durable.

More particularly, the invention provides a thermal insulation system for protecting against thermal and radiative conduction of energy, comprising an inner layer of heat shrink foam and an outer layer of reflective material. In the preferred embodiment, the outer layer of reflective material is heat shrink metalized material which has been recovered using known techniques onto the inner layer of heat shrink insulative material.

In another aspect of the invention, there is provided a method of thermally insulating a substrate, such as a brake fluid line for a vehicle, which comprises the steps of heat shrinking an inner layer of material onto the substrate and disposing an outer layer of reflective material onto the inner layer. Preferably, the disposing step involves heat shrinking the outer layer onto the inner layer, thereby advantageously avoiding the use of mechanical closures or adhesive, and permitting the adaptation of the thermal insulation system to a number of differently sized substrates.

In yet another aspect of the invention, there is provided a thermal insulation system for providing protection against thermal and radiative conduction of energy, which comprises a substrate, an inner layer of heat shrink material recovered onto the substrate, and an outer layer of reflective material disposed on the inner layer of material.

In still another aspect of the invention, a brake system for a vehicle comprises a brake fluid line, an inner layer of heat shrink foam recovered onto the brake fluid line, and an outer layer of heat shrink metalized material recovered onto the inner layer of foam.

The invention, together with additional features and advantages thereof, may best be understood by reference to the following description taken in conjunction with the accompanying illustrative drawing.

BRIEF DESCRIPTION OF THE DRAWINGS

The FIGURE is a cross-sectional view of a thermal insulation system for an elongate substrate, constructed in accordance with the principles of the present invention.

DESCRIPTION OF THE PREFERRED EMBODIMENT

Referring now more particularly to the drawing, there is shown a representative portion of a fluid line 10, which has been thermally insulated according to the principles of the present invention. The thermally insulated fluid line 10 may comprise an elongate substrate 20, such as a metal pipe, onto which is recovered a suitable length of heat-shrinkable tubing 30. Preferably, this inner layer of heat shrinkable tubing 30 comprises a radiation cross-linked and foamed heat-shrinkable tubing that provides thermal insulation against conducted heat. Polymeric foam is well known as an excellent heat insulator due to the trapped air which it contains. In the preferred embodiment, SUMITUBE™ 02P foamed heat-shrinkable tubing, which is available from Sumitomo Electric Industries, Ltd., of Osaka, Japan, and is described, for example, in U.S. Pat. No. 5,405,665, the specification of which is expressly incorporated by reference into this patent application, is utilized to form the inner layer 30.

Applicants have determined that an outer layer 40 of metalized heat-shrinkable tubing, recovered onto the inner layer 30 of heat-shrinkable tubing, provides unexpectedly improved insulation performance for a fluid line 10, which may comprise, for example, a critical portion of a brake line assembly that is disposed in close proximity to a source of excessive heat, such as an exhaust manifold or an engine block. In the preferred embodiment, the outer layer 40 comprises a product such as the SHRINKSHIELD™ product, available from Sumitomo Electric Industries, Ltd., which comprises a heat-shrinkable composite made from an outer layer of polyester and PVC, and an inner layer of aluminum metal. The SHRINKSHIELD product comprises an E.M.I. (Electro-Magnetic Insulating) material having a heat shrinkable function, which has heretofore been designed particularly for use in shielding radio wave leakage generation by digital electronic parts. It shrinks at approximately 90° C., with a shrink ratio of 2:1.

Of course, for either of the inner and outer layers 30, 40, other heat-shrinkable materials having similar properties may be used instead of the preferred SUMITUBE 02P and SHRINKSHIELD products disclosed herein, though it is important to the inventive systems that the outer layer 40 be metalized heat-shrinkable tubing. Applicants have advantageously determined that this metalized material, though designed for shielding against EMI/RFI or for electrical grounding purposes, is very useful for the purpose of heat shielding (against both thermal and radiative conduction of energy) because of its reflective properties. The metal employed is preferably aluminum, because of its relative low cost and high reflectivity, and may be very thin. The layer may be vapor or vacuum deposited, sputter coated, or applied by other suitable known techniques.

EXAMPLES

Although examples of the invention and comparative examples will be specifically used for the description of the present invention hereunder, the present invention is not limited only to these examples.

Tests were performed to compare the thermal properties of plain AlGal (aluminum galvanized) tubing, AlGal tubing which was wrapped with a layer of foamed heat shrinkable tubing, and AlGal tubing which was wrapped with an inner layer of foamed heat shrinkable tubing and an outer layer of a metalized heat shrinkable tubing. A radiant heat source used for each test comprised a hot plate placed on its side, positioned vertically. A "J" type thermocouple was used in each test, and was positioned perpendicular to the heat source during control testing. The heat source was adjusted for each test until the thermocouple read 280° F. A plurality of test pipes were employed in each procedure, and the heat source was less than ½ mm from each test pipe in each test procedure. The width of the radiant heat source was approximately ½ as great as the length of the test AlGal tubing in each procedure. Each of the tubes in each testing procedure was filled with brake fluid, the temperature of which was recorded at one minute intervals until the temperature leveled off for five minutes.

Example 1

In the first procedure, two AlGal tubes, having a ¼ inch diameter with no insulation were evaluated:

PLAIN TUBE

| Time (minutes) Start of Test | Plain Tube #1 86° F. | Plain Tube #2 76° F. |
|---|---|---|
| 1 | 119 | 128 |
| 2 | 160 | 179 |
| 3 | 193 | 208 |
| 4 | 211 | 225 |
| 5 | 222 | 236 |
| 6 | 229 | 241 |
| 7 | 230 | 243 |
| 8 | 232 | 244 |
| 9 | 232 | 244 |
| 10 | 232 | 244 |
| 11 | 232 | 244 |
| 12 | 232 | 244 |

Example 2

In the second procedure, three AlGal tubes, each covered with heat-shrink foamed insulation, specifically SUMITUBE™ 02A20P insulation, as described in U.S. Pat. No. 5,405,655, were tested:

TUBE COVERED WITH HEAT-SHRINK FOAMED INSULATION

| Time (min.) Start of Test | Tube #1 79° F. | Tube #2 83° F. | Tube #3 82° F. |
|---|---|---|---|
| 1 | 110 | 122 | 115 |
| 2 | 135 | 156 | 143 |
| 3 | 154 | 183 | 167 |
| 4 | 169 | 203 | 186 |
| 5 | 180 | 219 | 200 |
| 6 | 187 | 232 | 214 |
| 7 | 190 | 239 | 222 |
| 8 | 193 | 241 | 229 |
| 9 | 197 | 244 | 231 |
| 10 | 201 | 246 | 232 |
| 11 | 205 | 246 | 232 |
| 12 | 209 | 246 | 232 |
| 13 | 213 | 246 | 232 |
| 14 | 214 | 246 | 232 |
| 15 | 215 | — | — |
| 16 | 216 | — | — |
| 17 | 216 | — | — |
| 18 | 216 | — | — |
| 19 | 216 | — | — |
| 20 | 216 | — | — |

Example 3

In the third procedure, two AlGal tubes, each covered with an inner layer of heat-shrink foamed insulation, specifically SUMITUBE™ 02A20P insulation, as described in U.S. Pat. No. 5,405,655, and an outer layer of heat-shrink metalized insulation, recovered onto the inner layer, were tested:

| Time (minutes) Start of Test | Tube #1 83° F. | Tube #2 76° F. |
|---|---|---|
| 1 | 103 | 100 |
| 2 | 119 | 118 |
| 3 | 136 | 134 |
| 4 | 146 | 147 |
| 5 | 155 | 156 |
| 6 | 161 | 164 |
| 7 | 167 | 170 |
| 8 | 170 | 175 |
| 9 | 172 | 179 |
| 10 | 174 | 182 |
| 11 | 177 | 184 |
| 12 | 178 | 186 |
| 13 | 178 | 187 |
| 14 | 178 | 187 |
| 15 | 178 | 187 |
| 16 | 178 | 187 |
| 17 | — | 187 |

It is clear from a review of the foregoing examples that, in the case of the plain tube (Example 1), terminal temperatures of between 232 and 244° F. are reached within eight minutes of the start of the test, and, in the case of the tube having a heat-shrink foamed layer of insulation (Example 2), terminal temperatures of between 214 and 246° F. are reached within 10–14 minutes from the start of the test. There is, thus, only a small advantage to utilization of the foamed insulation surrounding the tube, in that it slows the increase in temperature of the fluid in the tube to some extent. However, it is also clear from Example 3 that the inventive combination of an inner layer of foamed heat-shrink insulation disposed about the tube, with an outer layer of heat-shrink metalized tubing disposed about the inner layer provides startlingly improved results. The terminal temperature for tubes wrapped in accordance with the principles of the invention was in the range of between 178 and 187° F., and that temperature was not reached until 12 minutes after the start of the test. Thus, significant extra heat protection may be provided to critical assemblies and components, and the invention is particularly effective in maintaining a temperature differential between a fluid being transported inside a pipe and an outside environment characterized by high temperature spikes.

Advantages of the inventive arrangement include the following:

1) Two separate components provide protection against both thermal and radiative conduction of energy;
2) The combination of the two separate components provides synergistic effects relative to either of the two components by themselves;
3) Heat shrinkability provides easy installation, and permits a single size of system to fit multiple substrate diameters. Importantly, no adhesive, mechanical closures, or other attachment means are necessary. This provides increased design flexibility for the end user;
4) The inventive system is space-saving and lightweight compared to alternatives comprising fiberglass and metal foil, such as wraparound products with adhesive or hook and loop closures;
5) With the inventive system, the insulation cannot fall off of the substrate;
6) Metalized heat shrink is normally used to shield against EMI/RFI or for electrical grounding purposes. It has never before been used, to the best of Applicants' knowledge, for the purpose of heat shielding.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A thermal insulation system for providing protection against thermal and radiative conduction of energy, comprising:
    an inner layer of heat shrink foam; and
    an outer layer of reflective material, comprising a heat shrink metalized composite material.
2. The thermal insulation system as recited in claim 1, and further comprising an elongate substrate onto which the inner layer of heat shrink foam is recovered.
3. The thermal insulation system as recited in claim 2, wherein the elongate substrate comprises a fluid conduit.
4. The thermal insulation system as recited in claim 3, wherein the fluid conduit comprises a brake line.
5. The thermal insulation system as recited in claim 1, wherein the inner layer of heat shrink foam comprises a radiation cross-linked and foamed heat shrinkable tubing.
6. The thermal insulation system as recited in claim 5, wherein the foam comprising said inner layer is polymeric foam.
7. The thermal insulation system as recited in claim 1, herein said outer layer of heat shrink metalized composite material further comprises an inner metallic layer and an outer non-metallic layer.
8. The thermal insulation system as recited in claim 7, wherein said inner metallic layer comprises aluminum.
9. The thermal insulation system as recited in claim 7, wherein said outer non-metallic layer comprises polyester and polyvinyl chloride (PVC).
10. A thermal insulation system for providing protection against thermal and radiative conduction of energy, comprising:
    a substrate;
    an inner layer of heat shrink material recovered onto said substrate; and
    an outer layer of reflective heat shrink material recovered onto said inner layer of material.
11. The thermal insulation system as recited in claim 10, wherein said substrate comprises a fluid conduit.
12. The thermal insulation system as recited in claim 11, wherein said fluid conduit comprises a brake line for conveying brake fluid.
13. The thermal insulation system as recited in claim 10, wherein said inner layer of material comprises foam.
14. The thermal insulation system as recited in claim 10, wherein said outer layer of reflective material comprises a metalized composite heat shrink material.
15. A thermal insulation system for providing protection against thermal and radiative conduction of energy, comprising:
    an elongate substrate;
    an inner layer of heat shrink foam, comprising a radiation cross-linked and foamed hear shrinkable tubing, recovered onto said substrate; and an outer layer of reflective heat shrink metalized composite material recovered onto said inner layer of heat shrink foam.

16. The thermal insulation system as recited in claim 15, wherein said outer layer of heat shrink metalized composite material further comprises an inner metallic layer and an outer non-metallic layer.

17. The thermal insulation system as recited in claim 16, wherein said inner metallic layer comprises aluminum.

18. The thermal insulation system as recited in claim 16, wherein said outer non metallic layer comprises polyester and polyvinyl chloride (PVC).

* * * * *